March 2, 1965

W. E. HENNELLS 3,171,328

PRESSURE FLUID CYLINDER

Filed May 3, 1961

INVENTOR.
WILLIAM E. HENNELLS

BY

Woodhams Blanchard and Flynn

ATTORNEYS

3,171,328
PRESSURE FLUID CYLINDER
William E. Hennells, Ann Arbor, Mich., assignor to W. E. Hennells Co., Inc., Belleville, Mich., a corporation of Michigan
Filed May 3, 1961, Ser. No. 107,552
1 Claim. (Cl. 91—26)

This invention relates to a floating cushion for reciprocating piston assemblies and particularly to a type thereof of improved simplicity and reliability.

Many types of cushion devices have long been known in the mechanical arts, particularly those utilizing either gas or liquid as the cushioning material, and one field of use in which such cushions have obtained great importance is the field of high speed, air-operated, reciprocating machinery.

While many of such cushions, as previously known, have been utilized to cushion the impact of a piston at the end of its stroke, the previously known cushions have been subjected to various disadvantages. Prominent among these disadvantages are the relatively high cost, lack of durability and difficulty in replacing the check valves utilized therein inasmuch as leakage through such valves will destroy the effective operation of the cushion. Therefore, it is desirable that such valves be readily replaceable, as needed, and yet it is desirable that such valves be inexpensive and durable.

Further, the pilot guiding means adjacent the side of the piston opposite that to which the load is connected is another point which is readily subject to wear. Inasmuch as the pilot will move radially somewhat in response to normal operation of the apparatus, it is necessary both that the pilot guide means be of wear resistant material and that such guide means be capable of radial movement in order to follow the normal movements of said pilot.

Accordingly, the objects of the invention are:

(1) To provide a fluid cushion construction wherein the means normally most subject to wear are highly resistant to such wear and which, when such wear does occur, can be easily and inexpensively replaced.

(2) To provide a fluid cushion construction, as aforesaid, in which the check valve utilized therein can be readily replaced as a unit and which check valve will be of sufficiently simple construction that its cost will be low whereby it can be frequently replaced in order to keep the cushion operating at a high level of efficiency.

(3) To provide a fluid cushion construction, as aforesaid, which utilizes a ball as the movable element of the check valve and wherein the valve seat is provided in the body of the cushion construction itself.

(4) To provide a fluid cushion construction, as aforesaid, in which the check valve is self-contained and hence is readily replaceable without the danger of losing any of the other parts of the cushion construction.

Other objects and purposes of the invention will become apparent to persons acquainted with devices of this type upon reading the following disclosure and inspecting the accompanying drawings.

Figure 1:
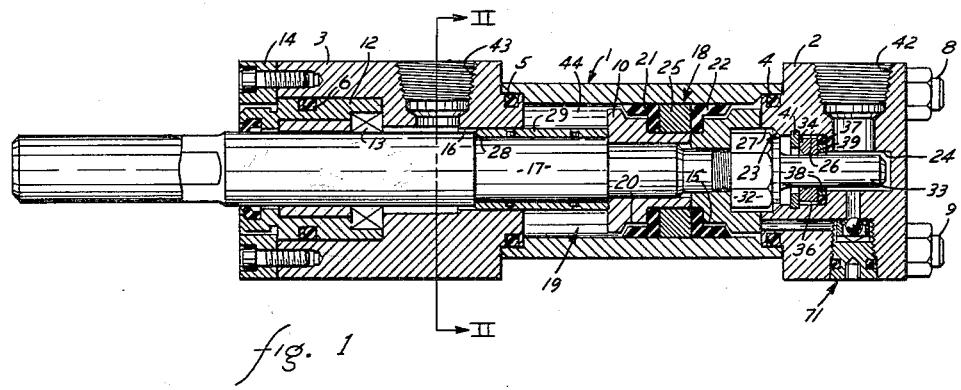
FIGURE 1 is a central, longitudinal, sectional view of a cushion, here an air cushion, embodying the invention.

The invention provides a cushion construction which includes a cylindrical casing 1 carrying at its respective ends the end blocks 2 and 3, each of said end blocks being sealed against the escape of fluid by O-rings 4, 5 and 6. Said end blocks are pulled toward each other and held snugly with respect to the casing 1 by a plurality of tie rods extending therebetween and appearing in part at 7, 8, 9 and 11 in FIGURE 2 and at 8 and 9 in FIGURE 1. A packing gland 12 is provided at the leftward end of the block 3 for holding a packing 13 in place, said gland itself being held in position by a gland ring 14.

The end block 3 has a central opening 16 therein through which extends a rod 17. The rod 17 carries a piston 18 and said piston is slidably disposed in the central chamber 19 in casing 1. The piston 18 is comprised of a leftward part 10 and a rightward part 15 which mate and define an annular groove 20. Cup seals 21 and 22 are mounted in groove 20 and are spaced apart by a separator 25. The seals 21 and 22 sealingly and slidably engage the wall defining chamber 19. A low-friction sealing sleeve 29, here of bronze, surrounds the central portion of the rod 17 and is slidable within opening 16 in end block 3. The sleeve 29 is held between the shoulder 28 on rod 17 and the end of the leftward part 10 of the piston 18. The whole piston assembly is held together by the nut 32 threaded onto the rod 17 adjacent the rightward part 15 of the piston 18.

The end block 2 has a stepped central opening 23 therein which defines a small diameter portion 24 at the rightward end thereof, an intermediate, medium diameter portion 26 and a large diameter portion 27 at the leftward end thereof. The rightward end portion 33 of the rod 17, which is of reduced diameter, is slidably disposed in opening 23 and acts in a known manner as a pilot for the rest of the rod and parts mounted thereon. A pilot guiding means or guide bushing 34 of hardened and wear-resistant material is disposed in portion 26 of opening 23 and snugly surrounds the pilot 33 of rod 17 but is provided with a clearance 36 to permit radial movement thereof. An O-ring 37 is located between the bushing 34 and the adjacent shoulder 38 between the portions 26 and 24 of opening 23. A spacer 39 of low friction material is located radially inwardly of said O-ring 37 but is spaced sufficiently from the surface of the pilot portion 33 to provide an easy clearance therebetween. The axial length of said spacer 39 as compared to the diameter of O-ring 37 is such that when the bushing 34 is urged rightwardly as appearing in FIGURE 1 the O-ring 37 will be tightly compressed against both the shoulder 38 as well as against the peripheral surface of portion 26 of said opening 23. A snap ring 41 holds the bushing 34 snugly in such position.

Figure 3:
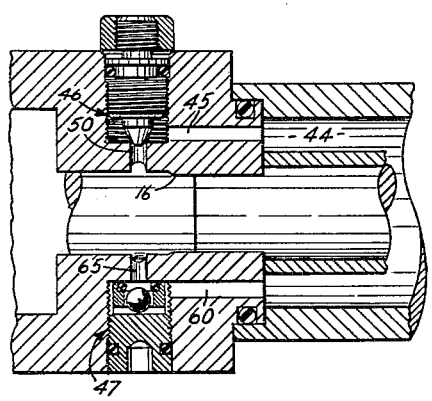
FIGURE 3 is a sectional view taken on the line III—III of FIGURE 2.

An opening 42 in block 2 provides for the introduction of working fluid into the central opening 23. An opening 43 in block 3 provides for the introduction of working fluid into the central opening 16. Where the piston is to be moved by pressure fluid supplied through openings 42 and 43, said openings can be connected to a suitable pressure source and exhaust as desired by means of any suitable valving arrangement (not shown). Where the piston is moved by external means, such as by some reciprocating element connected thereto, the openings 42 and 43 can be opened to the atmosphere. The pressure fluid zone 44 in chamber 19 leftwardly of the piston 18 communicates with opening 16, by means of a passageway 45 having a needle valve 46 therein and a passageway 60 having a check valve 47 therein (FIGURE 3). Communication between opening 16 and zone 44 is otherwise sealed by the sealing sleeve 29.

The needle valve 46 includes a base 48 threadedly inserted into a suitable opening in the side of the block 3. An O-ring 49 is mounted on base 48 to prevent leakage from said block. The base 48 carries a needle 51 which extends an adjustable distance into the passage 50 between opening 16 and passageway 45 to control the effective size thereof. A lock nut 52 is provided for holding the base 48 and thereby said needle 51 in adjusted position.

The check valve 47 includes a body part 53 threaded into the opening 54 in the block 3 and said body part is provided with an O-ring 56 for preventing escape of pressure fluid from within said block. An opening 57 is provided for receiving a wrench whereby said body part 53 may be inserted into or removed from said block 3. The body part 53 is provided with a transverse opening 58 adjacent its inner end and an axial opening 59 extends from said transverse opening 58 out through the inner end of said body part. The opening 58 communicates with an annular space 70 between the periphery of body part 53 and the wall of opening 54 and said annular space communicates with passageway 60. The opening 59 is stepped to provide a small diameter portion 61 and a large diameter portion 62. The small diameter portion 61 has a ball 63 therein, the diameter of said portion 61 being sufficiently greater than that of the ball to provide a substantial passageway for fluid around said ball. The large diameter portion 62 contains an O-ring 64 which is compressed sufficiently tightly therein that it will tend to stay in position even when the check valve body 53 is removed from the block 3. The size of said O-ring 64 is such that it will be compressed snugly against the bottom wall 66 of the opening 54 when the check valve body 53 is screwed snugly down with its inner end (leftward end as appearing in FIGURE 2) bearing tightly against the bottom wall 66 of said opening 54. The ball 63 is movable within portions 61 and 62 and is adapted to close passageway 65 when said ball is in its innermost position.

Figure 2:
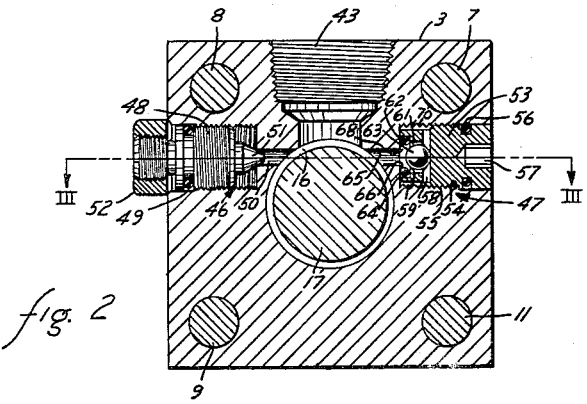
FIGURE 2 is a sectional view, on an enlarged scale, taken on the line II—II of FIGURE 1.

The length and diameters of the openings 61 and 62, together with the diameter of the ball 63 and the inner diameter of the O-ring 64, when the check valve body 53 is in its operating position, as shown, are all related to each other in such a manner that with the ball in its rightward position as shown in FIGURE 2, fluid within the opening 16 can pass through the passageway 65 into the opening 59, past the ball 63 then into the opening 58 and from there to the passageway 60 by which it may travel into the chamber 44. However, with the ball 63 in its inner (leftward) position it will bear solidly against the circular edge 68 of the opening in bottom wall 66 of the opening 54 which acts as a valve seat. The ball 63 at the same time preferably also contacts the O-ring 64 and deforms it further to provide a sealing guide between said ball and said O-ring. Thus, particularly if the ball 63 is of slightly deformable plastic material, the inner (leftward) position of the ball will provide two sealing areas, namely, the area where said ball bears against the O-ring 62 and also area where said ball bears against the circular edge 68.

Referring to a typical operation in which the rod 17 is reciprocated by means (not shown) located outside of the cylinder, rightward movement of the rod 17 and thereby the piston 18 will create a low pressure condition in zone 44 and, thus, fluid will be drawn from the opening 43 through the check valve 47 into said zone. Upon reverse movement of the rod 17, fluid flow through the check valve 47 will be blocked by the sealing of the ball 63 against the ring 64 and the corner 68 and fluid will travel from the zone 44 to the opening 43 by way of the passageway 45 and the needle valve 46 at a controlled rate which is regulated according to the setting of said needle valve.

A similar needle valve and check valve arrangement, the check valve of which appears at 71, is provided in the block 2 to control supply of fluid to the rightward end of central chamber 19 from the opening 42. The check valve and needle valve in block 2 may be and preferably are identical with the check valve 47 and needle valve 46 and hence need no further description.

Thus, movement of the rod 17 and thereby piston 18 in either direction is cushioned and proceeds at a controllable rate determined by the setting of needle valve 46 and the corresponding needle valve in end block 2. Supply of fluid to one end or the other of the central chamber 19 for cushioning purposes is controlled by the check valves 47 and 71. As fluid enters through one of said check valves into one end of chamber 19 the needle valve in the other end block permits fluid to discharge from the other end of said chamber at a controlled rate.

It will be observed that sealing sleeve 29 and bushing 34 seal the central chamber 19 from communication with openings 42 and 43 around the periphery of rod 17. Thus, fluid supplied to openings 42 and 43 will be supplied to central chamber 19 only through passageways 45 and 60 in block 3 and the corresponding passageways in block 2.

Although a particular preferred embodiment of the invention has been disclosed above in detail for illustrative purposes it will be understood that variations or modifications of such disclosure, which lie within the scope of the appended claims, are fully contemplated.

What is claimed is:

In a cushion for a reciprocating piston, the combination comprising:

a casing having a central chamber therein, a piston in said chamber and a rod extending in opposite axial direction from said piston;

a valve block at each end of said casing, each block having a central opening therein and fluid connection means for introducing pressure fluid into the opposite ends of said chamber;

said piston rod extending into the central opening of each valve block and one end of said piston rod extending through one of said valve blocks to a point outwardly thereof;

the central opening of the other valve block having an axially outer portion of small diameter and an adjacent coaxial intermediate portion of larger diameter with a shoulder being provided between said portion, the other end of said piston rod being of smaller diameter than said axially outer portion;

means providing a pair of sliding seals, one thereof being located between said rod and said one valve block at a point between said central chamber and the central opening within said one valve block and the other sliding seal being located between said rod and said other valve block at a point between the central chamber and said axially outer portion of the central opening of said other valve block;

said other sliding seal being received in said intermediate portion and comprising an annular spacer lying against said shoulder, the internal diameter of said spacer being greater than the diameter of the other end of said piston rod to provide a clearance therebetween and the external diameter of said spacer being substantially less than the diameter of said intermediate portion, an O-ring surrounding said spacer and compressed into tight sealing engagement with the periphery of said spacer, the wall of said intermediate portion and the shoulder, an annular guide bushing of hard and wear-resistant material having one axial end face thereof abutting against said spacer and said O-ring, said guide bushing having an internal diameter substantially equal to the diameter of said other end of said piston rod so that it snugly surrounds same, said guide bushing having an external diameter less than the diameter of said intermediate portion so that a clearance is provided therebetween in order that said bushing can move radially within said intermediate portion, means engaging the other axial end face of said bushing and holding said bushing within said intermediate portion abutting against said spacer and said O-ring.

(References on following page)

References Cited in the file of this patent

UNITED STATES PATENTS

| | | |
|---|---|---|
| 1,443,200 | Adams | Jan. 23, 1923 |
| 1,861,742 | Hand | June 7, 1932 |
| 2,262,432 | Rodder et al. | Nov. 11, 1941 |
| 2,596,779 | McCoy | May 13, 1952 |
| 2,878,896 | Farrell | Mar. 24, 1959 |
| 2,897,785 | Ortman | Aug. 4, 1959 |
| 2,965,354 | Grove et al. | Dec. 20, 1960 |
| 2,973,744 | Hennells | Mar. 7, 1961 |
| 2,985,358 | Lee et al. | May 23, 1961 |
| 3,009,476 | Usab | Nov. 21, 1961 |
| 3,027,877 | Lansky | Apr. 3, 1962 |